Dec. 2, 1958   R. W. COWARD   2,862,571
MULTIPLE TUBE CENTRIFUGAL DUST COLLECTOR
Filed Sept. 16, 1955   3 Sheets-Sheet 1

INVENTOR.
Richard W. Coward
BY
Jennings & Carter
Attorneys

Dec. 2, 1958 R. W. COWARD 2,862,571
MULTIPLE TUBE CENTRIFUGAL DUST COLLECTOR
Filed Sept. 16, 1955 3 Sheets-Sheet 2

INVENTOR.
Richard W. Coward
BY
Jennings & Carter
Attorneys

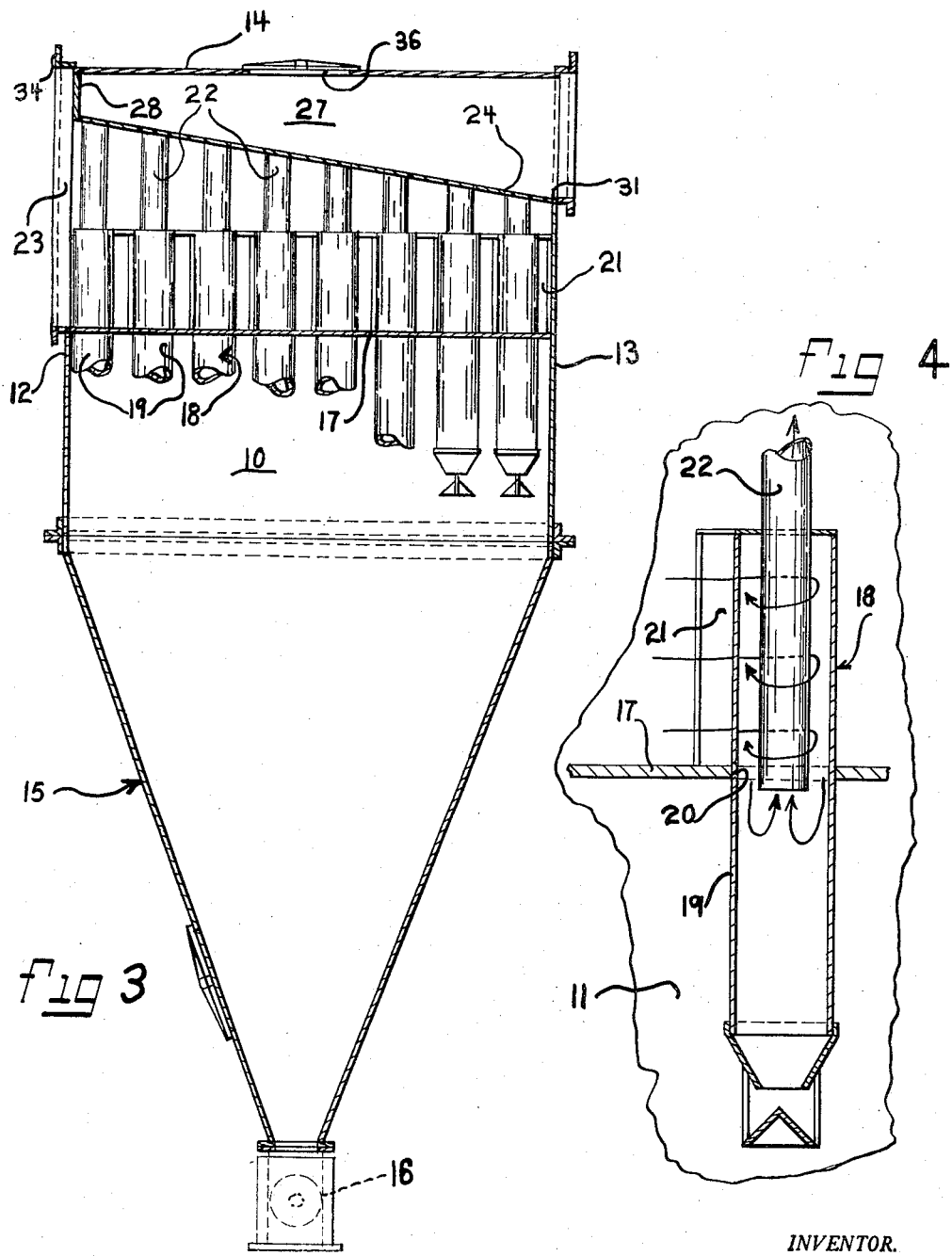

United States Patent Office 2,862,571
Patented Dec. 2, 1958

2,862,571

MULTIPLE TUBE CENTRIFUGAL DUST COLLECTOR

Richard W. Coward, Birmingham, Ala.

Application September 16, 1955, Serial No. 534,778

5 Claims. (Cl. 183—34)

My invention relates to apparatus for collecting dust from gases, and relates specifically to a dust collector embodying a plurality of centrifugal separating tubes.

An object of my invention is to provide a multiple tube centrifugal dust separator in which the tubes are so located relative to each other and relative to the flow of dust laden gas into the apparatus that the pressure in the apparatus is substantially constant adjacent each of the tubes, thereby causing each tube to handle substantially the same quantity of gas, increasing the efficiency of the apparatus.

Another object is to provide apparatus of the character designated in which, due to the physical placement of the collector tubes relative to each other, recirculation through the tubes is substantially eliminated, thereby causing each tube to operate upon and clean the maximum volume of gas with maximum efficiency of cleaning.

Another object is to position the dust collecting tubes in such manner as materially to decrease the effect of erosion thereon, and in which there is never more than one tube between any other tube and a source of the gas to be cleaned, thereby increasing the life of the tubes and increasing the separating efficiency thereof.

A further object is to dispose the dust collecting tubes in such manner that they are readily accessible for inspection, cleaning and repair.

Briefly, my invention contemplates a dust collector having a housing with a lower tube sheet therein defining with the walls and part of the top of the housing a chamber into which the dust laden gas is drawn or blown. Passing through the tube sheet are the lower, spiral shaped dust collecting sections of a plurality of centrifugal dust collecting units or tubes. The tubes are located on the tube sheet in rows parallel to the direction of flow of the dust laden gas, said rows being spaced laterally as will be explained to define longitudinally extending passages between groups of rows of tubes. The upper smaller diameter tube sections of each collector unit project through upper tube sheets along the sides of which are vertical plates welded gas tight thereto to form separate outlet spaces for the gas. The dust laden gas enters the longitudinally directed spaces or passages between groups of rows and flows laterally therefrom into the collecting sections of the collecting units. The spaces between groups of tubes serve also to permit a workman to enter the apparatus for servicing, cleaning, or replacing the tubes when needed. I preferably so lay out the rows of tubes that all of the tubes have no more than one tube between them and the spaces into which are directed the main dust laden gas streams. Since the dust laden gas is free to flow down the open spaces, a large part of the erosion of the tubes heretofore existing is eliminated. Furthermore, due to the fact that the dust laden gas is directed alongside the rows of tubes and thence laterally thereinto the pressure adjacent each tube is substantially constant throughout the entire chamber. This increases materially the capacity and efficiency of each individual tube and in addition reduces reentrainment of solids, by reducing recirculation of gases between certain of the tubes.

Apparatus illustrating features of my invention is shown in the accompanying drawings forming a part of this application in which:

Fig. 3 is a detail sectional view taken generally along the line III—III of Fig. 2; and Fig. 4 is a detail view taken generally along line IV—IV of Fig. 2.

Figure 1:
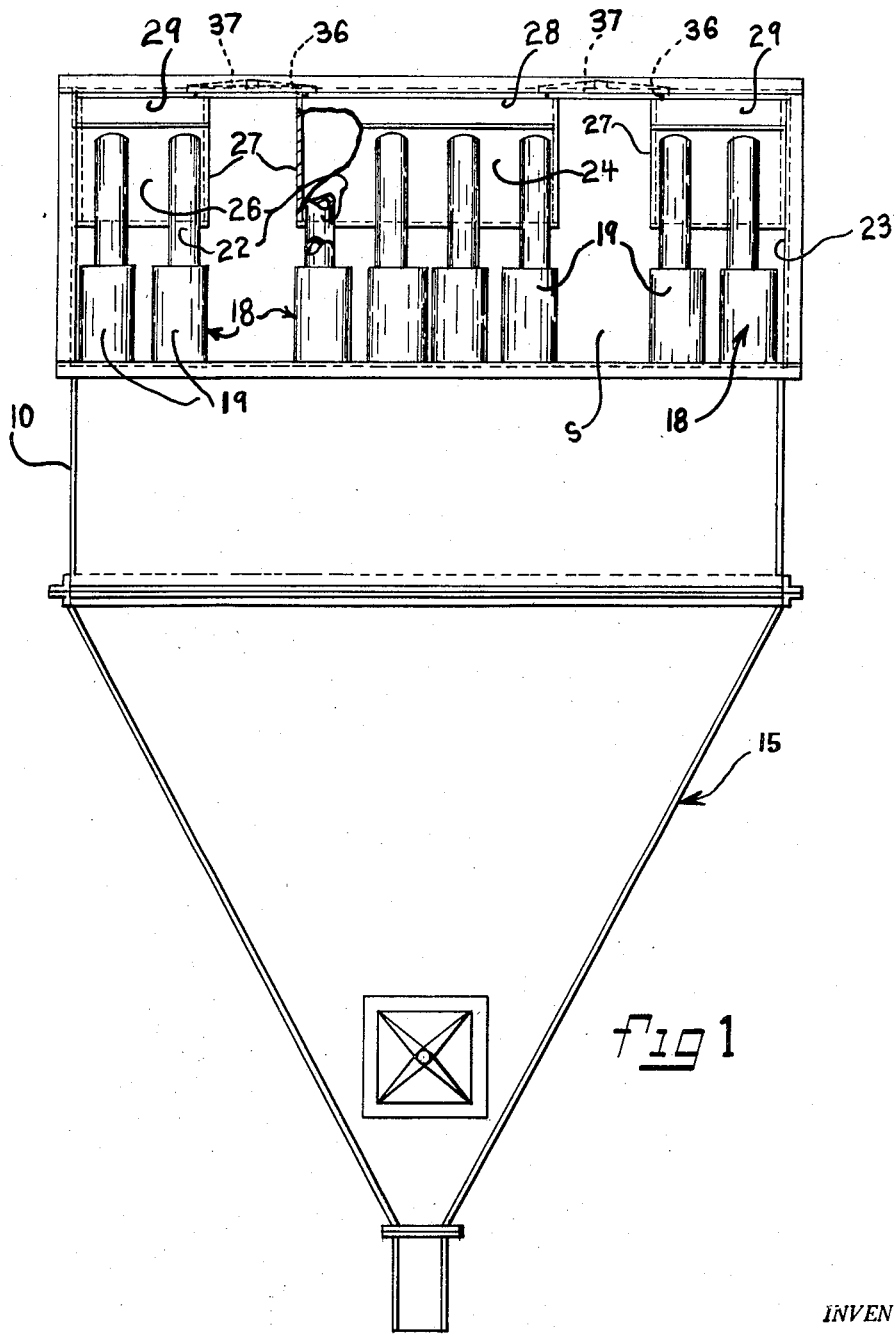
Fig. 1 is an elevational view of my improved apparatus as viewed from the inlet side thereof, certain of the parts being broken away and in section.

Referring now to the drawings for a better understanding of my invention my improved apparatus comprises generally a rectangular housing or casing having side walls 10 and 11, a front wall 12, a rear wall 13 and a top 14. The housing just described is provided with a hopper bottom indicated generally by the numeral 15. The hopper bottom is sealed and in the lower end thereof is a gas tight discharge mechanism 16 which may be in the form of a rotary screw.

In the housing is a lower tube sheet 17. The tube sheet 17 is horizontal and separates the hopper bottom portion 15 from the upper housing of the collector in gas tight manner as is well understood in the art.

Disposed on the tube sheet 17 and projecting therethrough are a plurality of centrifugal tubular dust collecting units indicated generally by the numeral 18. Each of the units 18 comprises a lower larger diameter tube section 19 having a tangential inlet 21 into which the dust laden gases enter. The tube sheet 17 is provided with holes 20 through which the sections 19 of the collecting units project whereby dust collected is discharged into the hopper section 15.

Projecting into the upper ends of each of the sections 19 of the collecting units 18 is a smaller diameter tube 22. The collecting units 18 are substantially standard and form no particular part of my present invention.

Figure 2:
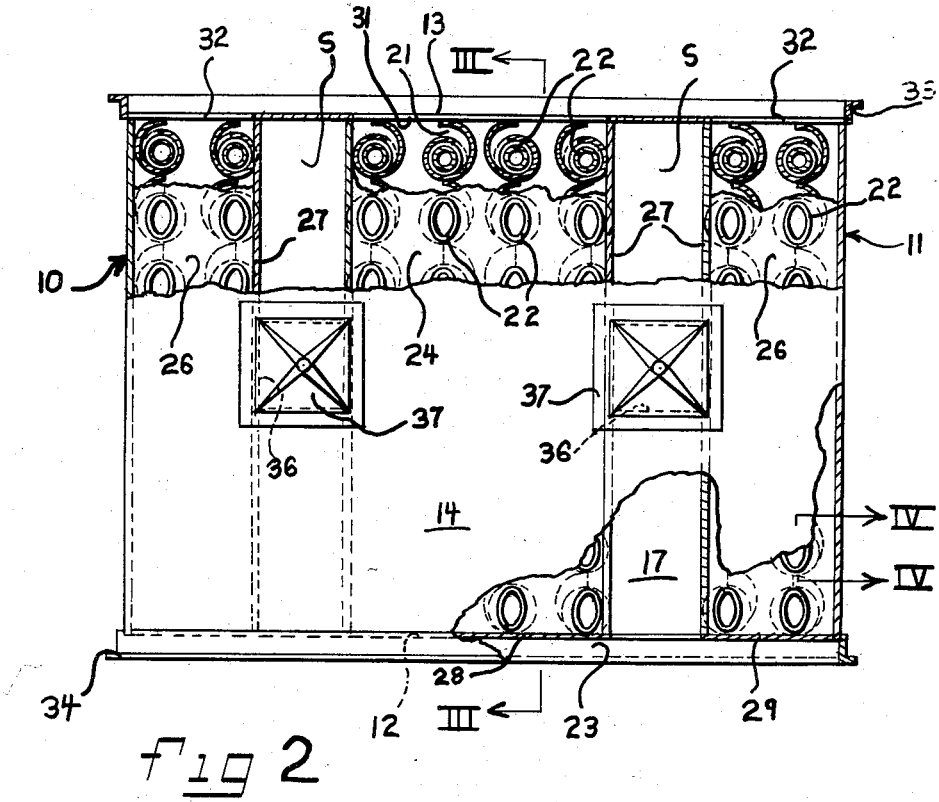
Fig. 2 is a plan view with certain of the parts broken away and in section.

The collecting units are disposed in rows as shown in Fig. 2 of the drawings. Thus, in the central part of the chamber there are four rows of units, then a space S on each side thereof and then two other rows of units. It will be understood that gas containing the dust to be separated is introduced through an opening 23 into the chamber. As shown in Fig. 1 this inlet extends completely across the chamber.

Mounted over the intermediate groups of rows of collecting units is a tube sheet 24. Mounted over the outer two rows are tube sheets 26. The small diameter tubes 22 project upwardly through the tube sheets as shown and are welded gas tight therein in any suitable manner. Also, the tube sheets 24 and 26 slope from the inlet side of the housing to the outlet side as indicated in Fig. 3 of the drawings.

Welded gas tight along the sides of the tube sheets 24 and 26 are vertical plates 27. The plates 27 also are made gas tight to the top plate 14 of the housing. The separate upper chambers thus formed are closed at the front by plates 28 and 29 as shown clearly in Fig. 1 of the drawings. It will thus be seen that there are provided three upper compartments, directly above the groups of rows of tubes, into which compartments the upper ends of the tubes 22 project. These compartments are gas tight relative to the chamber into which the gas enters through the inlet 23.

The back wall 13 of the housing is provided with openings 31 for the discharge of gases entering through the centermost group of tubes. Other openings 32 are provided for the sideward disposed group of tubes. Welded to the outer surface of the rear wall 13 is a clean gas discharge flange 33 which may be connected to the stack or to any other source of draft, not shown. A similar flange 34 is connected over the front plate 12 around the opening 23, to which the dust laden gas conduit may be connected.

Provided in the top cover 14 of the housing are suitable man holes 36. The man holes are directly over the spaces S and afford means for a workman to enter the collector to clean, inspect, or replace the various tubes therein. Suitable gas tight closures 37 are provided for the openings 36.

From the foregoing the method of constructing and using my improved dust collecting apparatus and the several advantages thereof may now be explained and understood. With the device constructed as shown it will be apparent that with dust laden gas entering the chamber through the opening 23 from some source of supply connected to the flange 34, the spaces S between the groups of rows of tubes afford uninterrupted passages into which the gas may move. With draft applied to the upper ends of the tubes 22, as by connecting discharge flange 33 to a stack or the like, it will be apparent that the dust laden gas enters the tangential inlets 21 of the lower collecting sections 19. The tangential openings cause the gas to assume a whirling path, whereupon the solids drop out into the hopper bottom and the clean gas proceeds up the tubes 22 into the chambers above the tube sheets 24 and 26, and thence out the openings 31 and 32. The dust laden gases are adequately distributed longitudinally relative to the direction of flow, insofar as accessibility to the collection sections 18 is concerned. The dust laden gas thus is delivered to the collection sections 18 in lateral paths from the main streams which flow down the spaces S. This lateral flow is directly from the spaces S into the sections 18 adjacent the spaces and laterally around the small tubes 22 of the intermediate rows. Thus, the collection sections farthest removed from the spaces S also receive gas to be cleaned from the spaces. Therefore, the pressure adjacent each collecting tube is substantially identical throughout the entire chamber into which the dust laden gas enters and this causes each tube to do its full proportionate part of the work and eliminates re-entrainment of solids which would occur and which does occur in prior apparatus due to the fact that pressure varies from place to place in the chamber. Also, it will be noted that all of the gas does not have to pass around the front tubes, that is, the tubes closest to the inlet side of the apparatus. A large part of such dust laden air flows down the spaces S, and another large part flows down the spaces between the tubes. It will be seen in Figs. 1 and 2 that the rows of the outer groups are spaced far enough apart to permit front to rear, unimpeded flow of gases between them. This is also true of the tubes of the outer rows of the central tube group relative to the innermost rows thereof. I therefore eliminate a substantial amount of the erosion which exists when all of the gas to be cleaned is blown directly into an inlet, across a solid row of tubes. Still further, with the openings 36 over the spaces S it is possible for a workman to enter the apparatus to clean the tubes or otherwise to inspect or replace them. Since there is no more than one tube in front of or between a workman standing in the spaces S and any other tube, they are quite readily accessible. This fact also reduces erosion inasmuch as gases reaching the innermost tube pass around only one additional row of tubes.

In actual practice my invention has proved to be extremely satisfactory. I have found that I am enabled to increase the collecting efficiency of the apparatus over apparatus embodying the same number of tubes of the same diameter by as much as 3½% in total collecting efficiency. Further, I am enabled, by the disposition of the tubes in the manner shown herein, to increase the total volume of air handled by each tube without increasing the draft or stack losses. I attribute this, as stated, to the fact that each tube is more directly supplied with the gas to be cleaned due to the provision of the spaces S between the groups of rows of tubes. The disposition of the tubes as shown and described herein also eliminates interference between the tubes due to flow of gases which has heretofore been responsible, in my opinion, for a considerable part of the loss of efficiency both volume-wise and efficiency-wise, in apparatus of this general type.

While I have shown my invention in but one form, it will be obvious to those skilled in the art that it is not so limited but is susceptible of various changes and modifications without departing from the spirit thereof, and I desire, therefore, that only such limitations shall be placed thereupon as are specifically set forth in the appended claims.

What I claim is:

1. The combination with a dust collector of the kind embodying a plurality of centrifugal dust collecting units and a housing having a chamber with an inlet opening into which passes the dust laden gas to be cleaned, a lower tube sheet connected to the housing, there being a plurality of holes in the lower tube sheet arranged in groups of rows extending parallel to the initial direction of flow of gas into the chamber, said plurality of centrifugal collecting units mounted in said holes and extending below said tube sheet, said rows of holes being spaced apart to define walkway and dust laden gas inlet spaces between said groups of rows, flow passage means to deliver dust laden gas from the chamber inlet into said spaces between said rows of units, flow passage means to deliver the dust laden gas from said spaces into said collecting units, said collecting units discharging collected dust from the lower ends thereof, other upper tube sheets connected to the housing above each group of rows of said collecting units, the upper ends of said collecting units being mounted in said other tube sheets to discharge cleaned gas from the upper ends thereof, plates cooperating with said other tube sheets and the housing to define separate clean gas chambers above said collecting units into which flows cleaned gas from the upper portions of the collecting units opening thereinto, and clean gas outlet means communicating with said chambers.

2. In a dust collector, a housing having an inlet opening for dust laden gas, a lower tube sheet connected to the housing, a plurality of rows of centrifugal tubular dust collector units mounted in the lower tube sheet and having lower end portions extending downwardly through the lower tube sheet and disposed to collect dust and discharge it through the lower ends thereof, said rows of units being disposed parallel to the direction of flow of gas delivered into the housing and being arranged in groups of rows with walkway and dust laden gas inlet spaces therebetween extending parallel to the rows, flow passage means to deliver dust laden gas from the chamber inlet into said spaces between said rows, upper tube sheets and plates connected thereto and providing within the housing separate gas chambers above the collector units, a clean gas outlet in the housing connected to said chambers, means connecting the upper end portions of the collector units to the upper tube sheets thereby to deliver cleaned gas to said chambers, and means to deliver dust laden gas from said housing inlet into said spaces between said rows of units.

3. Apparatus as defined in claim 2 in which there are man hole openings from outside the housing into the spaces therein between said groups of rows of collector units and removable closures for said openings.

4. Apparatus as defined in claim 2 in which said units are so arranged that there is a maximum of one unit only between the innermost units and said spaces between said groups of rows of units.

5. In a dust collector, a housing having a chamber having an inlet opening into which dust laden gas is introduced, a lower tube sheet in the housing, vertically disposed centrifugal tube type collecting units supported in the lower tube sheet and extending downwardly therethrough, said units being disposed to receive said gas and separate the dust therefrom and discharge it from the lower ends thereof and to discharge cleaned gas from the upper ends thereof, said collecting units being disposed in groups of rows parallel to each other and parallel to the initial direction of flow of dust laden gas into the housing, there being open walkway and dust laden gas inlet spaces in said chamber between said groups of rows of units above the lower tube sheet, flow passage means to deliver dust laden gas from the chamber inlet into said spaces between said rows of units, flow passage means to deliver the dust laden gas from said spaces into said collecting units, separate cleaned gas chambers above the collecting units into which said cleaned gas is discharged by said collecting units, means affording access to enter said walkway and dust laden gas inlet spaces from outside the housing, and a cleaned gas outlet communicating with said cleaned gas chambers.

References Cited in the file of this patent

UNITED STATES PATENTS

| | | |
|---|---|---|
| 2,143,664 | Snyder | Jan. 10, 1939 |
| 2,268,170 | Schmidt | Dec. 30, 1941 |
| 2,397,022 | Lincoln | Mar. 19, 1946 |
| 2,439,850 | Heller | Apr. 20, 1948 |
| 2,717,054 | Petersen | Sept. 6, 1955 |

FOREIGN PATENTS

| | | |
|---|---|---|
| 519,255 | Great Britain | Mar. 20, 1940 |